United States Patent [19] [11] 3,874,999
Zaremba et al. [45] Apr. 1, 1975

[54] PROCESS FOR THE PURIFICATION OF VIRUS VACCINE

[75] Inventors: Edmund Anthony Zaremba; Francis Robert Cano, both of Spring Valley, N.Y.

[73] Assignee: American Cyanamid Company, Stamford, Conn.

[22] Filed: Oct. 31, 1973

[21] Appl. No.: 411,564

[52] U.S. Cl. .................................................. 195/1.5
[51] Int. Cl. ............................................. C12k 7/00
[58] Field of Search ....................... 195/1.5; 424/89

[56] References Cited
UNITED STATES PATENTS
3,547,779 12/1970 Machlowitz et al. ............. 424/89
3,608,071 9/1971 Raynaud et al. .................. 424/89
3,632,745 1/1972 Apostolov ........................ 424/89

*Primary Examiner*—Sam Rosen
*Attorney, Agent, or Firm*—Jack W. Richards

[57] ABSTRACT

An improved process for removing non-viral protein and lipid impurities from an impure, egg grown virus preparation, in particular, influenza virus vaccine, by selective removal of these impurities using a magnesium salt of sulfuric acid.

3 Claims, 1 Drawing Figure

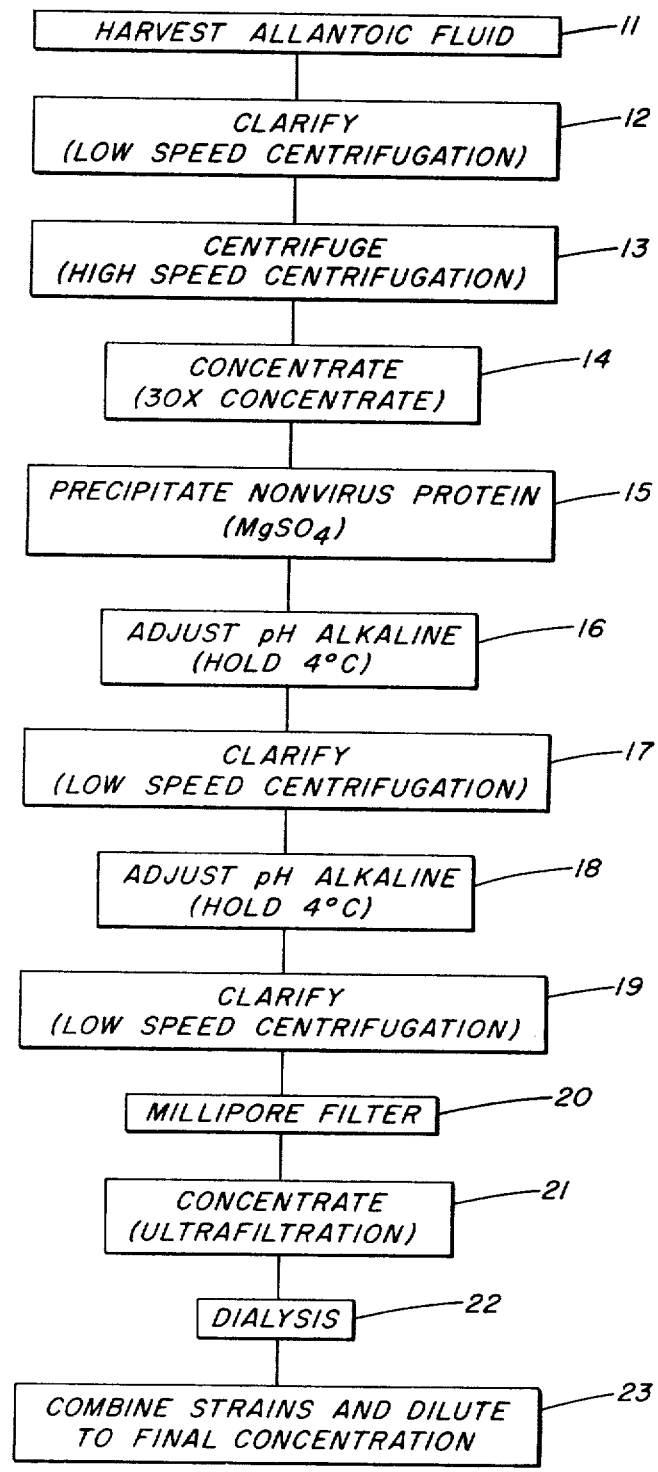

PROCESS FOR THE PURIFICATION OF VIRUS VACCINE

BACKGROUND OF THE INVENTION

The present invention is concerned with an improvement in the purification of embryonated egg-grown infectious agents, particularly influenza virus vaccine.

Influenza virus vaccines containing representative serologic types have been produced commercially for many years. Conventional manufacturing procedures consist of cultivating the various virus strains in the chorioallantoic cavity of fertile hen's eggs and subsequent high speed contrifugation of the harvested allantoic fluids. Centrifugation serves to concentrate the virus and achieves some degree of purification by eliminating soluble substances and low molecular weight contaminants in the supernatant. Unfortunately, vaccines prepared in this manner still contain large amounts of impurities which can produce fever, malaise or chills in recipients. The chick embryo origin of influenza vaccines contraindicates their use in persons allergic to chicken or egg protein.

The art of influenza vaccine production is replete with attempts to develop ancillary procedures to further reduce undesirable reactogenic substances. Following is a list of references for some of the known techniques that have been employed to purify influenza virus preparations: M. Lapidus, 1969. Applied Microbiology, Vol. 17, pages 504–506; J. L. Gerin and N. G. Anderson, 1969. Nature, Vol. 221, pages 1255–1256; British Pat. Specification No. 17,976/67; British Pat. Specification No. 8,232/67; French Pat. No. 84,337; U.S. Pat. No. 3,368,867; F. D. Brandon, et al., 1967. Journal of Immunology, Vol. 98, pages 800–805; K. Apostolov and B. Fishman, 1967. Nature, Vol. 215, pages 1287–1288; C. B. Reimer, et al., 1967. Journal of Virology, Vol. 1, pages 1207–1216; D. S. Pepper, 1967. Journal of General Virology, Vol. 1, pages 49–55; U.S. Pat. No. 3,316,153; U.S. Pat. No. 3,197,374; H. Mizutani, 1963. Nature Vol. 198, pages 109–110; N. Veeraraghavan and T. Sreevalsan, 1961. World Health Organization Bulletin, Vol. 24, pages 695–702; W. J. Hausler and E. C. Dick, 1960. Journal of Infectious Diseases, Vol. 107, pages 189–194; and Wallis, Homma and Melnick, Applied Microbiology, Vol. 23, pages 740–744 (1972).

U.S. Pat. No. 3,632,745 discloses the purification of influenza viruses by dialysing a suspension of the virus against water containing bivalent metallic cations (e.g., magnesium) at a concentration of from about 0.003 to about 0.12M until the virus forms a precipitate and then separating the fractions containing the virus. The anion accompanying the cations may be sulphate. However, the U.S. Pat. No. 3,632,745 is only concerned with precipitation of the virus by dialysis while the method of the present invention involves direct precipitation of non-viral contaminants. Moreover, in the U.S. Pat. No. 3,632,745 only a bivalent metallic cation concentration of from 0.003 to about 0.012M is disclosed as operable whereas in the practice of the method of the present invention a concentration of magnesium cation of from about 0.1 to about 0.4M is considered as operable. Other differences exist between the disclosure in the U.S. Pat. No. 3,632,745 and the present invention. Limited experience indicates, however, that a preferred minimum concentration of magnesium would be 0.15 to 0.2M. Lower amounts of magnesium would precipitate very little non-viral material.

U.S. Pat. Nos. 3,485,718 and 3,547,779 both disclose the use of barium sulfate in the purification of influenza virus. The two methods of these patents precipitate the virus, whereas the magnesium salt does not. U.S. Pat. No. 3,478,145 discloses the use of calcium phosphate in the purification of influenza virus. None of the above mentioned patents or publications employ magnesium sulphate in the purification of influenza viruses as set forth herein.

SUMMARY OF THE INVENTION

The invention resides in an improvement in removing proteinaceous and lipid materials from an impure, egg grown virus preparation, in the purification of virus vaccines, wherein the improvement consists of treating a phosphate buffered viral suspension with about 0.1 to about 0.4 molar solution of magnesium sulfate, preferably 0.15 to 0.2 molar, at a pH of 8.0 to 9.0, at about 4°C. for about 16–72 hours preferably 16–18 hours, followed by removal of the salt precipitated protein impurities through centrifugation. The virus preparation is preferably influenza vaccine. Limited experience has been had with other magnesium salts, e.g., magnesium chloride shows promise, but its use requires further work. Limited experience also indicates that ammonium sulfate also precipitates non-viral materials. However, comparative experiments would have to be done to compare effectiveness of the magnesium sulfate with the other salts. In the process of the present invention, the virus is not precipitated whereas non-viral materials are under the stated conditions. The present methods requires the presence of magnesium and phosphate salts in the virus milieu. The critical step in this purification process is the adjustment of pH to the alkaline side.

Although many procedures have been devised to purify influenza virus, most are unsuitable for commercial manufacturing of influenza vaccine. To be useful, any such procedure must be capable of accommodating large volumes of virus material within a short period of time. Moreover, the procedure should not entail the need for expensive or special equipment and should preferably not result in excessive virus loss.

The present invention represents an important improvement in conventional procedures[1] used for manufacturing influenza because it results in reduction of potentially reactogenic substances in the finished product. The procedure can be rapidly applied to multi-liter quantities of influenza virus.

[1] Stanley, W. M. The preparation and properties of influenza virus vaccines concentrated and purified by differential centrifugation. J. Exp. Med. 81: 193–217 (1945).

According to the invention, any strain of any virus capable of culture in embryonated eggs can serve as starting material. However, since the primary thrust of this invention is concerned with influenza vaccine, the balance of this disclosure will be specifically directed to it.

The virus (for example, B/Massachusetts/3/66); X-37A (a hybrid virus containing the hemagglutinin and neuraminidase antigens of A/Eng/42/72); or X-38A (a hybrid virus containing equi/hemagglutinin and the A/Eng/42/72) is inoculated into the allantoic cavity of fertile hen's eggs and the fluid therefrom is harvested under aseptic conditions after a suitable incubation time. Gross particles are removed from the pooled virus-containing fluids by low speed centrifugation. The virus is removed from the allantoic fluid by high speed centrifugation and the sediment is reconstituted to one-thirtieth original fluid volume in the desired buffer, usually sodium phosphate or a mixture of sodium phosphate and sodium citrate, containing a low concentration of formaldehyde.

In the improvement of this invention, nonvirus protein and lipids are removed by treatment of the buffered, virus containing suspension with about 0.1 to about 0.4M (most preferably about 0.2) molar magnesium sulfate at a pH of about 8.0 to about 9.0 (preferably about 8.5), at about 4°C. for about 16–18 hours.

The resultant suspension is clarified by low speed centrifugation, the pH of the supernatant is adjusted to about 8.0 to about 9.0 (preferably about 8.5) and allowed to stand for between 16 to 18 hours at about 4°C. Additional clarification can be obtained by a second treatment with additional salt and/or pH adjustment to about pH 8.5. This suspension is again clarified by low speed centrifugation and the supernatant fluid passed through a millipore pre-filter pad. The filtrate is ultrafiltered to concentrate the virus and diafiltered to remove the magnesium salt and low molecular weight impurities. The concentrate is sterilized by ethylene oxide and diluted to final concentration.

Strains may be combined by combining just prior to final dilution.

BRIEF DESCRIPTION OF THE DRAWING

The FIGURE is a flowsheet illustrating the steps to be carried out in the method of the present invention using magnesium sulfate to precipitate non-virus protein.

DETAILED DESCRIPTION OF THE INVENTION

The following will serve to further illustrate the improved process of this invention.

Referring to the FIGURE, after the embryonated eggs have been injected with the influenza virus and incubated, the allantoic fluid is harvested in harvesting step 11. In step 11, only the extra embryonic fluid is harvested, and not the yolk and membranes. Monovalent pools of harvested allantoic fluid are collected in such size as to be conveniently handled and processed. After harvesting step 11, the allantoic fluid is then clarified in clarifying step 12 by low speed centrifugation. After clarification step 12, the clarified monovalent allantoic fluid is subjected to high speed centrifugation in centrifugation step 13 to bring down the sediment virus. In concentration step 14, the sedimented virus is then resuspended in a sterile sodium phosphate-sodium citrate buffer solution and the resulting suspension triturated and subsequently centrifuged. The supernatant fluid is saved and the solids discarded after additional elution and centrifugation. The collected supernatant suspension is then diluted with formalin in distilled water so as to provide a virus concentration of 30X (30 fold) over that present in the original harvested allantoic fluid. After the 30X concentration step 14, a high proportion of the remaining non-viral proteinaceous and lipid materials are removed from the 30X concentration suspension in precipitation step 15 by the addition of magnesium sulfate until preferably a 0.2 molar concentration of magnesium sulfate is reached. After the magnesium sulfate addition, the pH of the concentrate is adjusted to the alkaline side, preferably to about 8.5, in step 16, with sodium hydroxide and the concentrate held at about 4°C. for about 16 to 18 hours or overnight. After holding, the concentrate is then subjected to low speed centrifugation in clarification step 17 and the supernatant collected. After step 17, steps 15 and 16 may optionally be repeated. In step 18, the pH of the collected supernatant is readjusted to the alkaline side, preferably to about pH 8.5, and held again at about 4°C. for 16 to 18 hours or overnight. After holding, the supernatant is subjected to low speed centrifugation in clarification step 19 and the supernatant filtered through a millipore prefilter in filtering step 20. The filtrate or concentrate is then passed through an Amicon ultra-filter in concentration step 21 to further concentrate it. After concentration, the concentrate is diafiltered in dialysis step 22 with aqueous citrate-phosphate buffer to remove the magnesium sulfate. In step 23, the strains are combined, diluted to final concentration and sterile filtered.

EXAMPLE

Eleven day embryonated eggs are drilled in the air sac end and through this opening is injected 0.2 ml. of a dilution of influenza virus previously titrated and calculated to produce maximum virus growth in 48 hours. The injected eggs are held at 34°C. at a relative humidity of 60–75% for 48 hours. At the end of the incubation period, the eggs are candled and those containing dead embryos are discarded. The living eggs are chilled at 4°C. for 15 to 20 hours. The extra embryonic fluids are recovered. Yolk and membranes are not harvested. Monovalent pools of fluid are prepared in such size as to be conveniently handled and processed. During any lag in the processing cycle, the pooled fluids are held at approximately 4°C. with 1:10,000 concentration of thimerosal as preservative. After harvest the infected fluids are clarified by low speed centrifugation.

On the following day, the monovalent fluids are processed through a centrifuge with a minimum rotor G force of 48,000 and at a flow rate designed for optimum virus clean-out. During the centrifugation, the bowl and reservoir are refrigerated. At the end of the run, the containers are washed with 0.1 molar sodium phosphate buffer, pH 7, containing 1:4,000 solution of formalin U.S.P. and 1:10,000 thimerosal. Within 24 hours after centrifugation, the sedimented virus is resuspended in 1/60 volume of sterile buffer solution which contains 0.1 molar sodium phosphate and 0.4 molar sodium citrate with 1:4,000 solution of formalin, U.S.P. and 1:10,000 thimerosal. This suspension is triturated and held at 25°C. for two hours. Subsequently, it is centrifuged in a bucket-type centrifuge at 2,000 r.p.m. for 20 minutes. The supernatant is saved and the pellet, which contains insoluble non-viral material, is discarded following an additional elution and centrifugation step. The supernatant suspension is then diluted with 1 volume of sterile 1:4,000 solution of formalin U.S.P. in distilled water yielding a volume equivalent to one-thirtieth the original volume of harvest. This dilution will reduce the sodium phosphate buffer to 0.05 molar, and the sodium citrate to 0.2 molar level.

In addition to the above initial virus purification step by ultracentrifugation, a processing stage of the influenza virus vaccine concentrate is utilized to remove a high proportion of the remaining nonviral egg protein and lipids. Crystalline $MgSO_4$ is added with constant stirring to the 30X concentrate (virus in the allantoic fluid is concentrated 30 fold) until a 0.2M concentration of MgSO₄ is reached. The pH is then adjusted to 8.5 with NaOH and the concentrate is held at 4°C. for 16-18 hours. The concentrate is then low speed centrifuged and the supernatant collected. The supernatant is readjusted to pH 8.5 with NaOH and held at 4°C. for 16-18 hours. After another low speed centrifugation the supernatant is filtered through a Millipore prefilter. The concentrate is then processed by passage thru an Amicon ultra-filter. After concentration, this material is diafiltered with a volume of 0.085M citrate and 0.05M phosphate buffer equivalent to a minimum of five times the volume of the concentrate to remove the MgSO₄.

The monovalent concentrates are treated with liquid ethylene oxide by the following procedure: The concentrates are held at 4°C. after processing. To the concentrate is added liquid ethylene oxide that has been cooled to 4°C. or lower. The ethylene oxide is added to a concentration of 0.5% by volume with constant agitation. The treated concentrates are held at 25°C. for 24 hours with occasional agitation by hand. After treatment, the ethylene oxide is removed from the monovalent concentrate within 48 hours, by exposure to reduced pressure. There should be less than 0.5 mg./ml. of residual ethylene oxide in the concentrate. After treatment with ethylene oxide, samples are removed from the monovalent concentrates for CCA titration, sterility and identity tests. The final vaccine consists of sufficient monovalent concentrates diluted to provide the CCA (chicken cell agglutination test — a measure of viral activity or potency) titers specified in the formula issued by the Bureau of Biologics. The diluent for final vaccine consists of sufficient sterile distilled water and sodium phosphate plus sodium citrate to adjust the final salt concentrations to 0.05 molar sodium phosphate buffer and 0.085 molar (+0.015) sodium citrate. Samples are removed from the bulk vaccine for potency, sterility, safety, infectivity tests and analytical determinations. When all tests are satisfactory, the vaccine is filled into final containers.

We claim:

1. In a process for removing non-viral proteinaceous and lipid materials from an impure, egg grown virus preparation, the improvement which consists of treating the phosphate buffered viral suspension with about 0.1 to about 0.4 molar solution of magnesium sulfate at a pH of about 8.0 to about 9.0 at about 4°C. for about 16-72 hours; and removing the salt precipitated protein impurities by low-speed centrifugation.

2. A process according to claim 1, wherein the egg grown virus preparation is influenza vaccine.

3. A process according to claim 2, wherein the salt solution is about 0.2 molar magnesium sulfate and the pH of the suspension is about pH 8.5.

* * * * *